A. R. DAVIS.
Process of Removing the Skin of Potatoes.
No. 206,934. Patented Aug. 13, 1878.
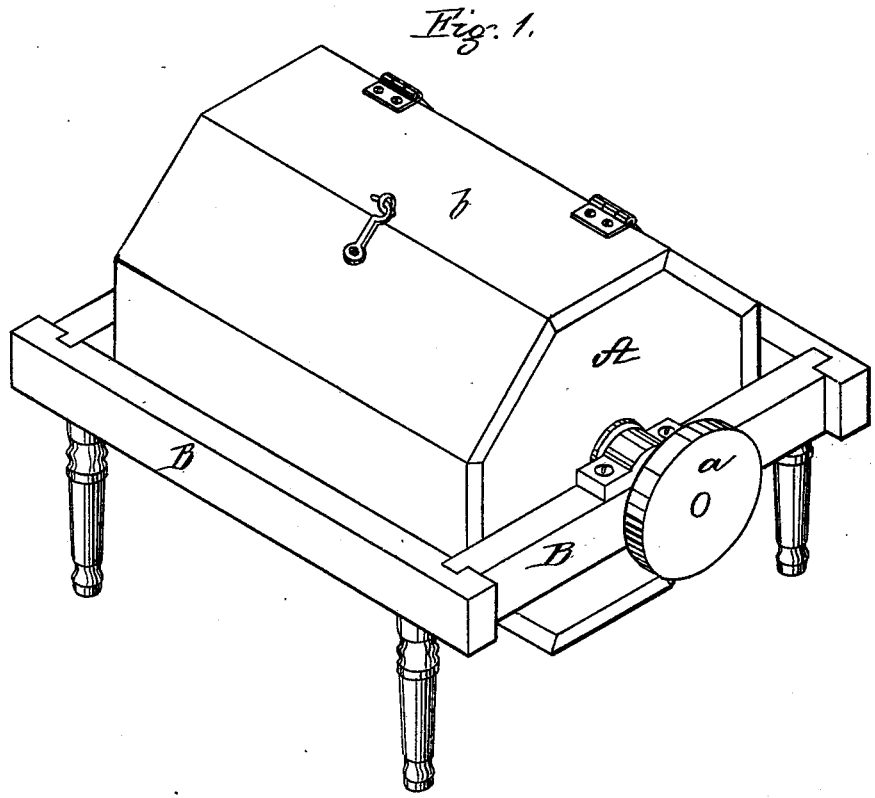
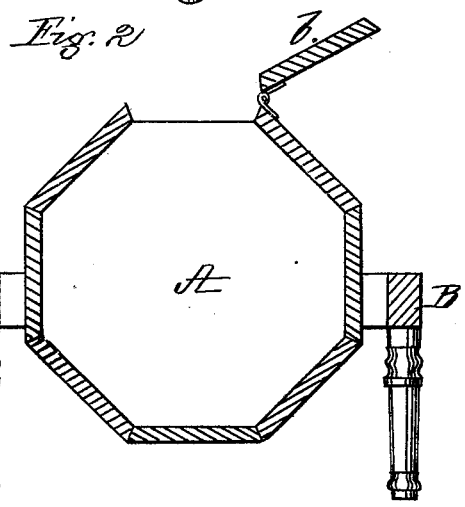

UNITED STATES PATENT OFFICE.

ABBOT R. DAVIS, OF BOSTON, MASSACHUSETTS.

IMPROVEMENT IN PROCESSES OF REMOVING THE SKIN OF POTATOES.

Specification forming part of Letters Patent No. 206,934, dated August 13, 1878; application filed July 18, 1878.

*To all whom it may concern:*

Be it known that I, ABBOT R. DAVIS, of Boston, in the county of Suffolk and State of Massachusetts, have invented a new Process of Removing the Skin or Outer Covering of Potatoes, of which the following is a full, clear, and exact description, reference being had to the accompanying drawings, making part of this specification, in which—

Figure 1 is a perspective view of an apparatus which I employ in my process of removing the skin of the potatoes. Fig. 2 is a transverse vertical section through the same.

Potatoes at present are peeled singly by hand with a knife or by means of a suitable paring-machine, each potato being handled and operated on separately, which, beside occupying considerable time, occasions much waste. This method answers well for small quantities; but where large quantities are used in preparing fried potatoes for sale greater dispatch is desirable, in order to reduce the expense to a minimum.

My invention has for its object to accomplish this result, and to do away with the necessity of operating upon each potato separately; and consists in removing the skin or outer covering of potatoes by agitating them in a suitable receptacle with ground quartz or other suitable gritty substance having sharp angular surfaces, which serve to abrade and cut away the skin of the potato, which is thus removed in an extremely expeditious manner at a very trifling cost.

To enable others skilled in the art to understand and use my invention, I will proceed to describe the manner in which I have carried it out.

The potatoes to be operated on are placed in a box or receptacle, A, preferably of polygonal form in cross-section, this box being hung in a suitable frame, B, and adapted to be rotated by a belt to be applied to a pulley, *a*, the box being provided with an aperture closed by a hinged cover, *b*.

A quantity of ground quartz or other suitable gritty substance having sharp angular surfaces is also placed within the receptacle A with the potatoes, the quantity of gritty substance employed being in about the proportion of fifty to seventy-five pounds to three to five bushels of potatoes; but this proportion may be varied, if desired.

I prefer to employ a gritty substance the size of the particles of which is about one-twenty-fifth of an inch in diameter; but coarser or finer particles may be used.

The receptacle A is now rotated at such a degree of speed as to cause its contents to be violently agitated and the potatoes to be rolled over and against each other and into contact with the gritty substance, which has the effect of rapidly abrading or grinding off the skin or outer covering of the potatoes, the surface of which is thus removed to a uniform depth, irrespective of shape or size, the great waste incident to the operation of paring by hand or machine being thus avoided.

The length of time to which the potatoes are submitted to this process will depend upon the age and consequent hardness of the skin. For instance, new potatoes will not require to be acted on by the gritty substance so long as old potatoes. After once ascertaining by experiment the length of time required to remove the skin of a lot of potatoes of one kind this time will not require to be changed until a different kind of potato is to be operated on, whereby the necessity of frequently examining the contents of the receptacle and the delay occasioned thereby are avoided.

In practice I prefer to mix a little water with the potatoes and gritty substance to facilitate the abrading process; but this is not essential, as sufficient moisture is produced from the potatoes themselves.

After the skin of the potatoes has been removed, as described, the receptacle A is stopped and water is introduced therein, when the contents are slightly agitated by partially rotating the receptacle, the object of which is to thoroughly wash the potatoes, so as to entirely remove the slimy pulp and adhering gritty substance, and cause the particles of the latter to be precipitated to the bottom; or the potatoes can be removed from the receptacle A and washed in a suitable vessel, the precipitated abrading substance being collected for further use.

I do not confine myself to the employment of a receptacle, A, of the form shown, as one of any other suitable form may be used; and, instead of being rotated, the receptacle may be oscillated, reciprocated, or otherwise agitated without departing from the spirit of my invention.

What I claim as my invention, and desire to secure by Letters Patent, is—

The process of removing the skin or outer covering of potatoes by agitating them in a suitable receptacle with ground quartz or other suitable gritty substance having sharp angular faces, substantially as set forth.

ABBOT R. DAVIS.

In presence of—
P. E. TESCHEMACHER,
N. W. STEARNS.